US011401978B2

(12) United States Patent
Alves et al.

(10) Patent No.: US 11,401,978 B2
(45) Date of Patent: Aug. 2, 2022

(54) DISCONNECTABLE MECHANICAL ANTI-BACKLASH COUPLING MECHANISM FOR TORQUE TRANSMITTING SHAFTS

(71) Applicant: EMBRAER S.A., São José dos Campos (BR)

(72) Inventors: Henrique Böckmann Alves, São José dos Campos (BR); Expedito De Souza Ribeiro, São José dos Campos (BR); Guilherme Cremasco Coelho, São José dos Campos (BR); Everton Sérgio Ribeiro Da Silva, São José dos Campos (BR); Rafael Santos Iwamura, São José dos Campos (BR); David Dias Ferraz, São José dos Campos (BR)

(73) Assignee: YABORA INDUSTRIA AERONAUTICA S.A., Sao Jose Dos Campos-Sp (BR)

( * ) Notice: Subject to any disclaimer, the term of this patent is extended or adjusted under 35 U.S.C. 154(b) by 313 days.

(21) Appl. No.: 16/815,316

(22) Filed: Mar. 11, 2020

(65) Prior Publication Data
US 2020/0309198 A1 Oct. 1, 2020

Related U.S. Application Data

(60) Provisional application No. 62/823,830, filed on Mar. 26, 2019.

(51) Int. Cl.
*F16D 11/14* (2006.01)
*F16D 11/00* (2006.01)
(Continued)

(52) U.S. Cl.
CPC .............. *F16D 11/14* (2013.01); *F16D 48/00* (2013.01); *F16D 2011/006* (2013.01); *F16D 2121/14* (2013.01); *F16D 2125/60* (2013.01)

(58) Field of Classification Search
CPC .............. F16D 11/14; F16D 2011/006; F16D 2121/14; F16D 2127/04; F16D 2125/60
See application file for complete search history.

(56) References Cited

U.S. PATENT DOCUMENTS 4,775,040 A * 10/1988 Telford ................... F16D 11/14
192/69.43
4,924,852 A * 5/1990 Suzuki ................. A61B 1/0052
600/150
(Continued)

*Primary Examiner* — Stacey A Fluhart
(74) *Attorney, Agent, or Firm* — Nixon & Vanderhye P.C.

(57) ABSTRACT

Coupling mechanisms for torque transmitting shafts are provided with sliding and fixed plates operably connectable to respective torque transmitting shafts, and a leaf spring having a preloaded spring force exerted on the sliding plate when the sliding and fixed plates are operably connected to one another. A hub is attached to the leaf spring and coaxially received within the sliding plate to allow the sliding plate to be capable of reciprocal axial movements relative to the hub between engaged and disengaged positions wherein the sliding and fixed plates are engaged and disengaged with one another so as to allow and prevent torque being transmitted from one to another of the shafts, respectively. An inner piston is coaxially received within the hub and moveable between a first position wherein the hub retains the sliding plate in the engaged position thereof, and a second position wherein the hub releases the sliding plate to allow movement of the sliding plate under bias force from the leaf spring into the disengaged position thereof.

20 Claims, 8 Drawing Sheets

(51) Int. Cl.
    *F16D 125/60*     (2012.01)
    *F16D 121/14*     (2012.01)
    *F16D 48/00*     (2006.01)

(56) References Cited

U.S. PATENT DOCUMENTS

| | | | |
|---|---|---|---|
| 6,454,071 B1 * | 9/2002 | Peter | F16D 3/185 |
| | | | 192/101 |
| 2010/0089679 A1 * | 4/2010 | Inomori | F16D 25/086 |
| | | | 180/219 |
| 2014/0231192 A1 * | 8/2014 | Asano | B61H 1/00 |
| | | | 188/74 |
| 2016/0040726 A1 * | 2/2016 | Shiotsu | F16D 21/04 |
| | | | 74/333 |

* cited by examiner

DISCONNECTABLE MECHANICAL ANTI-BACKLASH COUPLING MECHANISM FOR TORQUE TRANSMITTING SHAFTS

CROSS-REFERENCE TO RELATED APPLICATION

This application is based on and claims domestic priority benefits of U.S. Provisional Application Ser. No. 62/823,830 filed on Mar. 26, 2019, the entire contents of which are expressly incorporated hereinto by reference.

FIELD

The embodiments disclosed herein relate generally to torque transmitting mechanisms. More specifically, the embodiments disclosed herein related to backlash free mechanical torque transmitting mechanisms that allow for quick disconnect in response to a preset force.

BACKGROUND

Friction clutches are well known torque transmission units that can be used as a disconnectable shaft coupling. However, considering compatible equipment size and limited disengagement force, friction clutches may have a limited maximum transmitted torque. In order to increase the maximum transmitted torque, a multi-disk friction clutch can be used with no significant increase on overall equipment volume. However, the disks on this type of torque transmitting device needs an axial degree of freedom to allow wear and manufacturing deviations without loss on the maximum rated transmitted torque. This degree of freedom is typically achieved using sliding engagements (usually splines) between disks and shaft. As those in this art can appreciate, the use of sliding engagements in such a system causes backlash during clutch engagement.

A splined coupling or large teeth ("dog engagement") could also be used to connect two shafts, but as multi-disk clutches, such a conventional concept also suffers from backlash. In addition, the force needed to disconnect this type of coupling is highly dependent on the transmitted torque.

Another kind of disconnection device is also conventionally used whereby the torque is transmitted through a plate and a leaf spring which are force-preloaded against each other. The plate is fixed to one shaft and the leaf spring is fixed to the other shaft. Such a force-preload ensures friction between plate and leaf spring in addition to the provision of notches that ensure physical engagement between the plate and leaf spring so as to avoid slippage. A set of spheres and a second sliding plate hold the preload. When the set of spheres is released, the sliding plate is free to move and the preload is relaxed thereby disengaging the coupling. In this type of system, there is no rotational backlash between shafts due to friction, and due to physical coupling, a considerable maximum transmitted torque is achieved. Also, the set of spheres responsible for keeping the force-preload ensures a consistent disengagement force that is not dependent on the transmitted torque.

However, the set of spheres are released through the actuation of a piston inside the mechanism. The actuation of this inner piston is accomplished through a steel cable that runs inside the shaft up to its end so it can route to the disconnection handle. This routing in turn makes the mechanism device harder to install on the shafts and limits its use to hollow shafts with open ends. The reconnection procedure for such a device requires a feedback from an electrical switch positioned inside the mechanism. This switch indicates when the mechanism is properly reconnected, and therefore, a special tool is needed to read the switch status. Therefore, in order to reconnect this type of device, two special tools are used, namely, an electrical board with a light to check the switch status and a mechanical jack to apply the force-preload on the plates.

To summarize, there is only one conventionally available device to engage two torque transmitting shafts allowing disconnection with a consistent force without rotational backlash when engaged, however such a device has the following limitations:

Difficulty in assembly since the actuation by cable is routed through one of the shafts; and Reconnection procedure is difficult since an electrical sensor must be checked to ensure complete reconnection, so a special tool to check the electrical switch is necessary.

There is therefore a continual need to allow operative connection of two torque transmission shafts without backlash while at the same time allowing relatively easy manual disconnection with a controlled preset force. The embodiments disclosed herein are therefore directed to fulfilling such needs.

SUMMARY

The mechanical coupling mechanism of the embodiments disclosed herein allows precise rotational engagement without rotational backlash between two coaxial torque transmission shafts with a fast disconnection feature when a handle is actuated with a pre-set force. This pre-set force may be selectively adjusted inside the coupling mechanism and the torque transmitted through the mechanism does not affect it considerably. A special mechanical jack is needed to preload the mechanism to reconnect the device after being disconnected. Moreover, an integral visual mechanical indicator shows the reconnected status.

Additionally, according to the embodiments disclosed herein, the cable to the disconnection handle attaches to a bellcrank on the side of the coupling mechanism. This allows the coupling mechanism to be self-contained since there is no longer a requirement to route an actuation cable from the coupling mechanism through the shaft to the shaft's open end and then route the cable to the disconnection handle. This improvement is important to provide ease of installation of the coupling mechanism on the shafts and thereby allows it to be used as a Line Replacement Unit (LRU). The coupling mechanisms according to the embodiments disclosed herein may also be operationally employed with solid or closed-ended shafts.

According to one embodiment, the coupling mechanism for torque transmitting shafts will include sliding and fixed plates operably connectable to respective torque transmitting shafts, a leaf spring having a preloaded spring force exerted on the sliding plate when the sliding and fixed plates are operably connected to one another. A hub is attached to the leaf spring and coaxially received within the sliding plate to allow the sliding plate to be capable of reciprocal axial movements relative to the hub between engaged and disengaged positions wherein the sliding and fixed plates are engaged and disengaged with one another so as to allow and prevent torque being transmitted from one to another of the shafts, respectively. An inner piston is coaxially received within the hub and moveable between a first position wherein the hub retains the sliding plate in the engaged position thereof, and a second position wherein the hub releases the sliding plate to allow movement of the sliding plate under bias force from the leaf spring into the disengaged position thereof.

The sliding plate may include a circumferential internal sliding plate groove, while the hub may include at least one ball detent which is received within the internal groove of the sliding plate when the hub is in the first position thereof so as to retain the sliding plate in the engaged position thereof. The inner piston of such an embodiment may thus comprise a piston groove which is aligned with the at least one ball detent when the hub is in the second position thereof so as to allow the at least one ball detent to be released from the sliding plate groove.

A disconnection bell crank may be operably connected to the inner piston to move the inner piston from the first position to the second position thereof in response to the bell crank being moved into a disconnection position thereof.

According to some embodiments, the leaf spring may comprise a flange fixed to an end of the hub. The fixed plate may comprise a rotational bearing, while the flange associated with the leaf spring may comprise a forwardly projecting shaft coupled to the rotational bearing to allow one of the torque transmitting shafts to rotate when sliding and fixed plates are disconnected. In such an embodiment the forwardly projecting shaft may optionally include an adjusting nut threadably connected to a terminal end thereof to allow positional adjustment of the flange so as to responsively adjust the leaf spring, fixed plate and sliding plate preload.

Each of the sliding and fixed plates may include multiple torque transmission arms having terminal ends that are releasably connected to one another when the sliding plate is in the engaged position thereof. The terminal ends of the sliding and fixed plates may thus include conformably shaped recesses and bosses such that when engaged with one another torque from one of the shafts may be transmitted to the other shaft via the coupling mechanism.

A visual indicator may be associated with the disconnection bell crank to visually indicate the sliding plate being in the engaged position thereof. According to such an embodiment, the visual indicator may comprise a visual marking on the disconnection bell crank, and a fixed position indicator plate having a slot, wherein alignment of the visual marking and the slot of the indicator plate provides visual indication that the sliding plate is in the engaged position thereof.

The coupling mechanism may comprise connection sleeves to connect the coupling mechanism to respective ones of the torque transmitting shafts. A scissors jack assembly may thus be provided so as to be operably connectable to a respective one of the connection sleeves and the sliding plate to move the sliding plate from the disengaged position thereof to the engaged position thereof. According to some embodiments, a connection sleeve and the sliding plate may each include an externally circumferential groove, while the scissors jack includes a pair of opposed jaws each being positionable in a respective circumferential groove associated with the connection sleeve and the sliding plate. Operating the scissors jack so as to spread apart the opposed jaws thereof causing the sliding plate to be moved from the disengaged position and into the engaged position thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
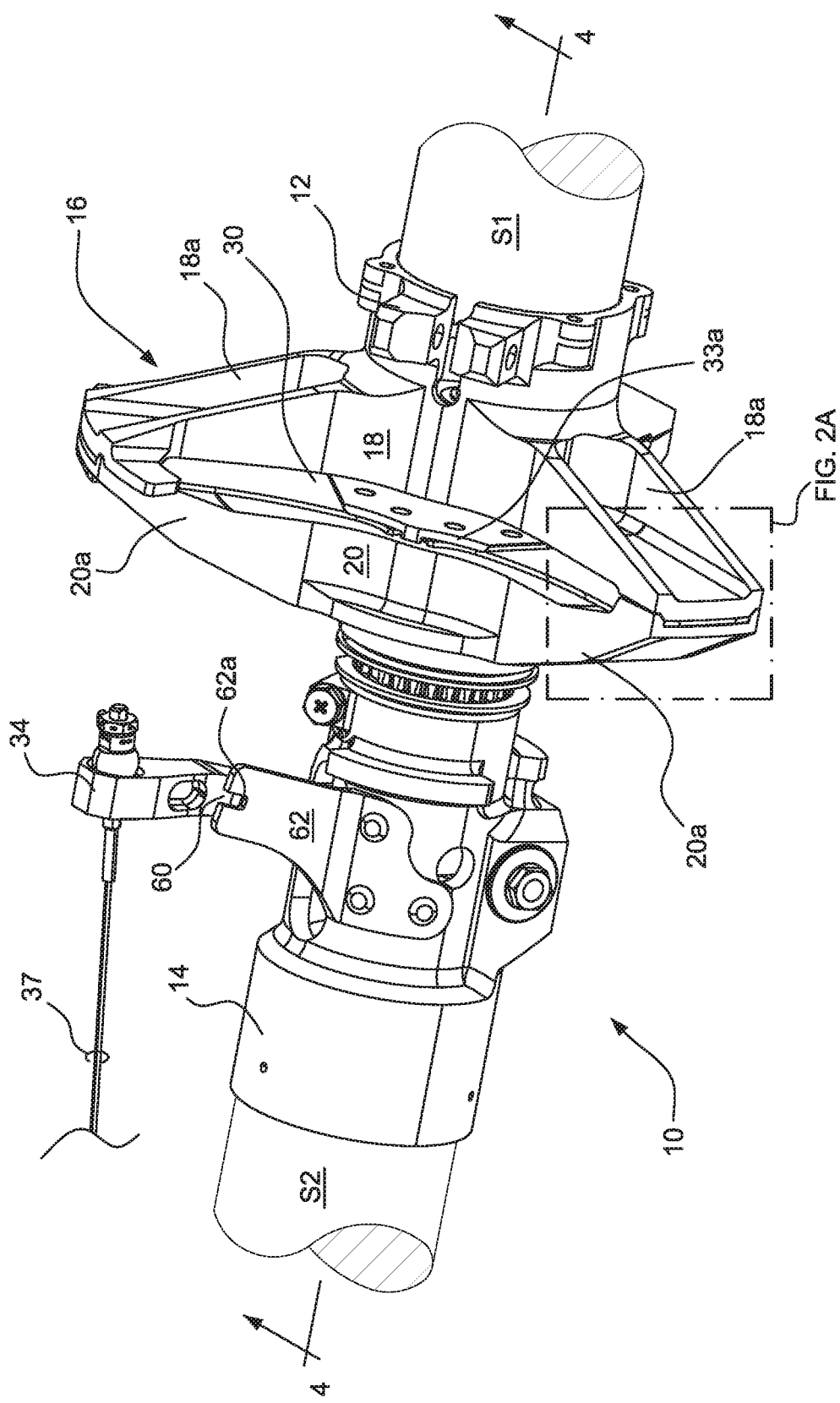
FIG. 1 is a perspective view of a disconnectable mechanical anti-backlash coupling mechanism for a torque transmission unit associated with a pair of coaxially aligned shafts.
Figure 2A:
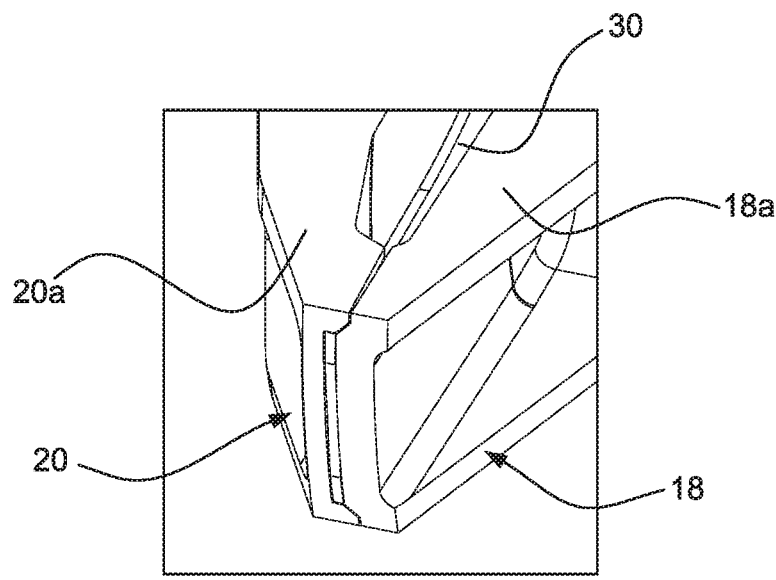
FIG. 2A is an enlarged view of the torque transmission arms associated with the torque transmission unit shown in FIG. 1 in an engaged position.
Figure 2B:
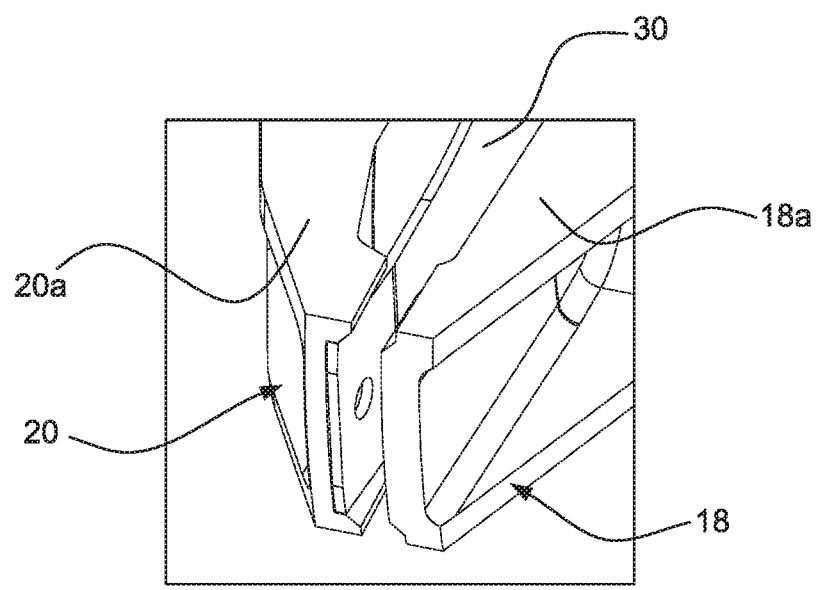
FIG. 2B is an enlarged view of the torque transmission arms similar to FIG. 2 but shown in a disengaged position.
Figure 3:
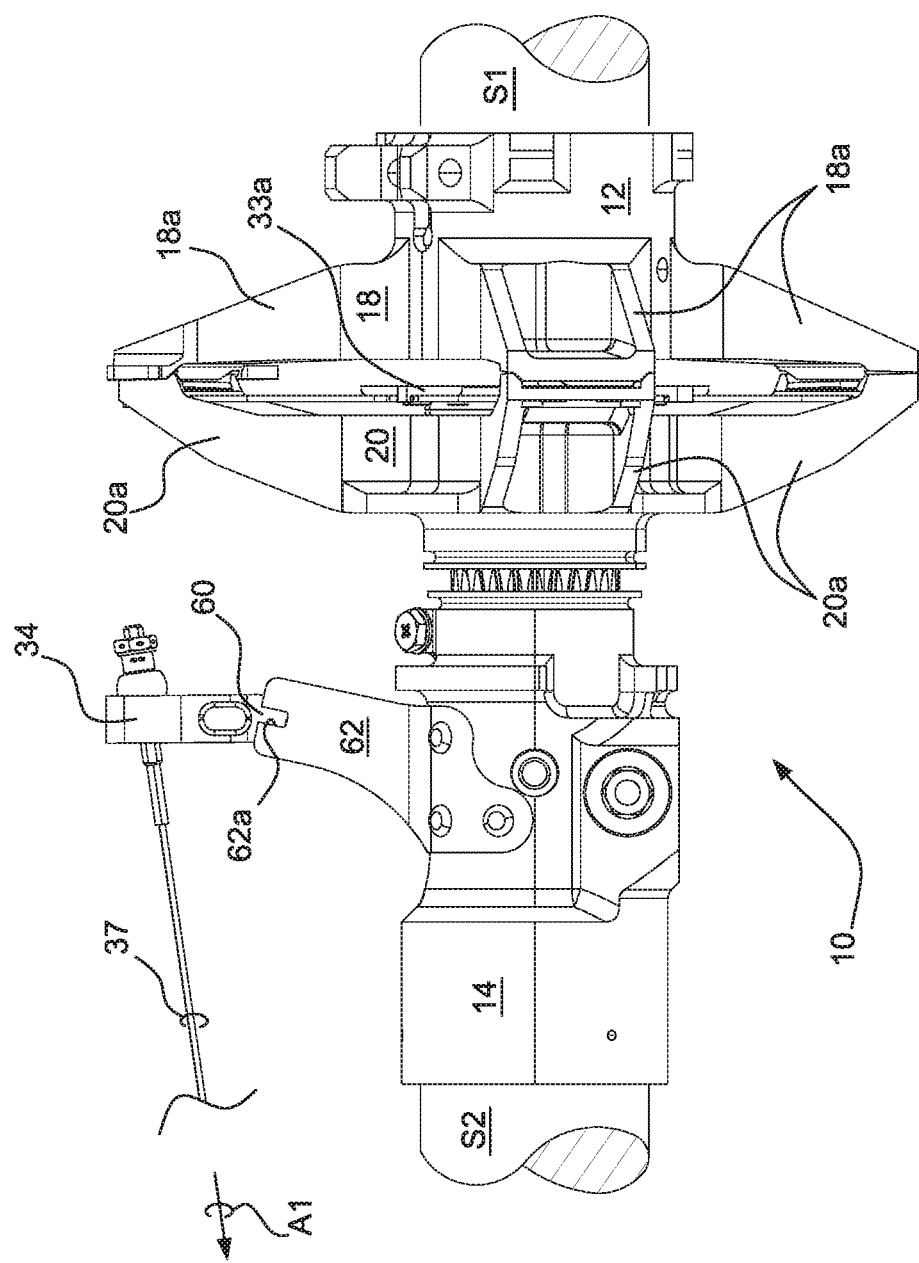
FIG. 3 is a side elevational view of the coupling mechanism shown in FIG. 1.

Accompanying FIGS. 1-3 depict a coupling mechanism 10 in accordance with an embodiment of the present invention. As shown, the coupling mechanism 10 is provided with connection sleeves 12, 14 that serve to operably connect the coupling mechanism 10 to respective coaxially aligned shafts S1, S2, respectively. A torque transmission unit 16 is provided with a fixed plate 18 operatively associated with the connection sleeve 12 and the shaft S1, and a sliding plate 20 operatively associated with the connection sleeve 14 and the shaft S2. In the embodiment depicted, each of the plates 18, 20 includes a series of radially extending torque transmission arms 18a, 20a that cooperatively engage one another to thereby allow torque to be transmitted from shaft S1 through the plates 18, 20 and to shaft S2.

The terminal ends of the torque transmission arms 18a, 20a include conformably shaped bosses and recesses, respectively, as shown in FIGS. 2A and 2B. Thus, when in the engaged position as depicted in FIG. 2A, the bosses of the arms 18a will be received within the recesses of the arms 20a to thereby allow torque to be transmitted from the shaft S1 to the shaft S2. Conversely, when in the disengaged position as depicted in FIG. 2B, the bosses and recesses of the arms 18a, 20a, respectively, will be separated from one another thereby preventing torque from shaft S1 being transmitted to shaft S2.

As is perhaps best shown in FIGS. 4-7, a leaf spring 30 is connected to a terminal flange 33a associated with an inner hub 33 coaxially received within the sliding plate 20. The sliding plate 20 is thereby capable of being reciprocally moved axially relative to the hub 33. As will be explained in greater detail below, the leaf spring 30 is preloaded with a selected force to cause the sliding plate 20 to disconnect from the fixed plate 18 upon disengagement of the coupling mechanism 10.

Figure 4:
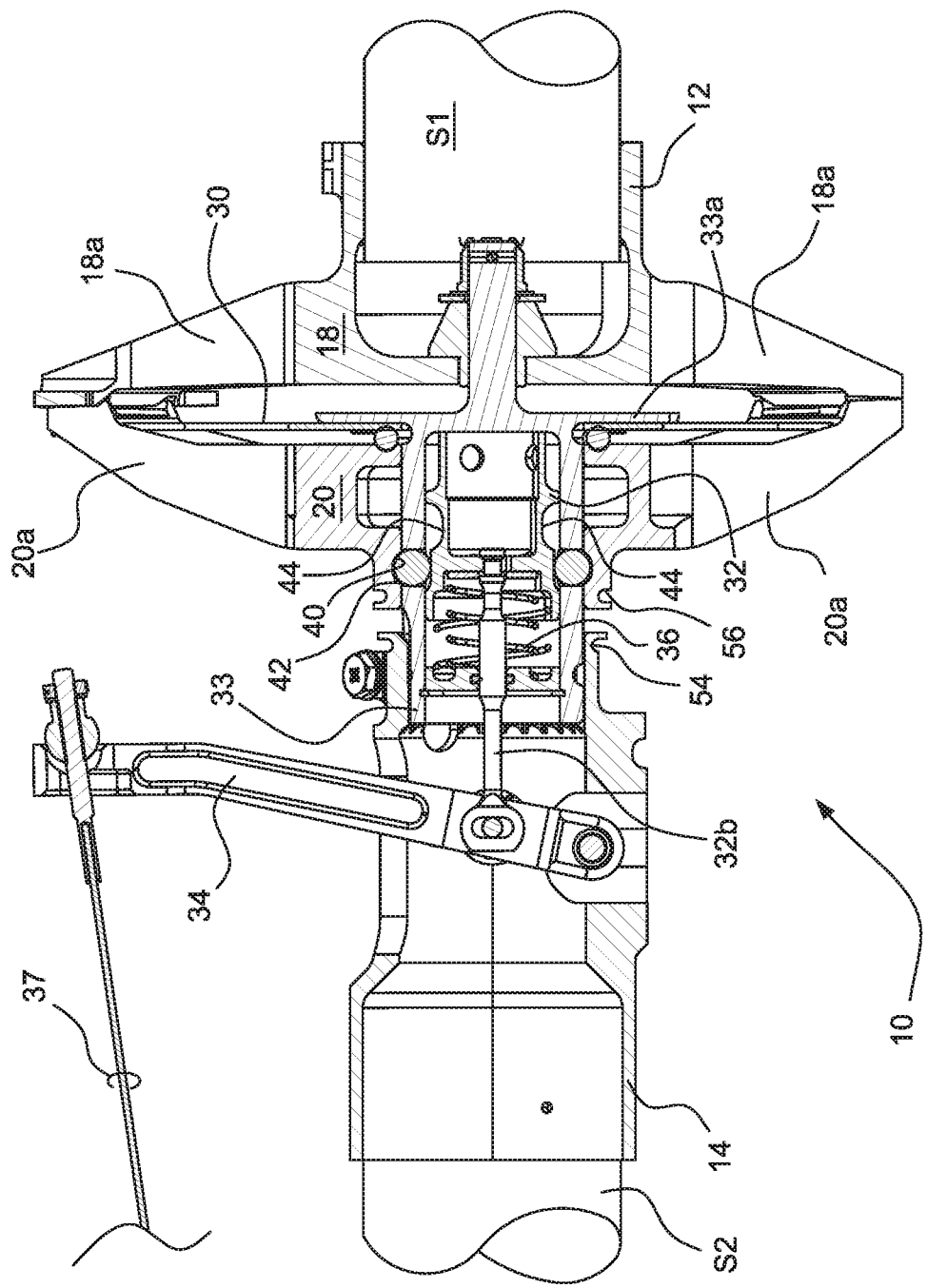
FIG. 4 is cross-sectional elevational view of the coupling mechanism shown in FIG. 1 as taken along line 4-4 therein and depicted in the engaged position thereof.
Figure 5:
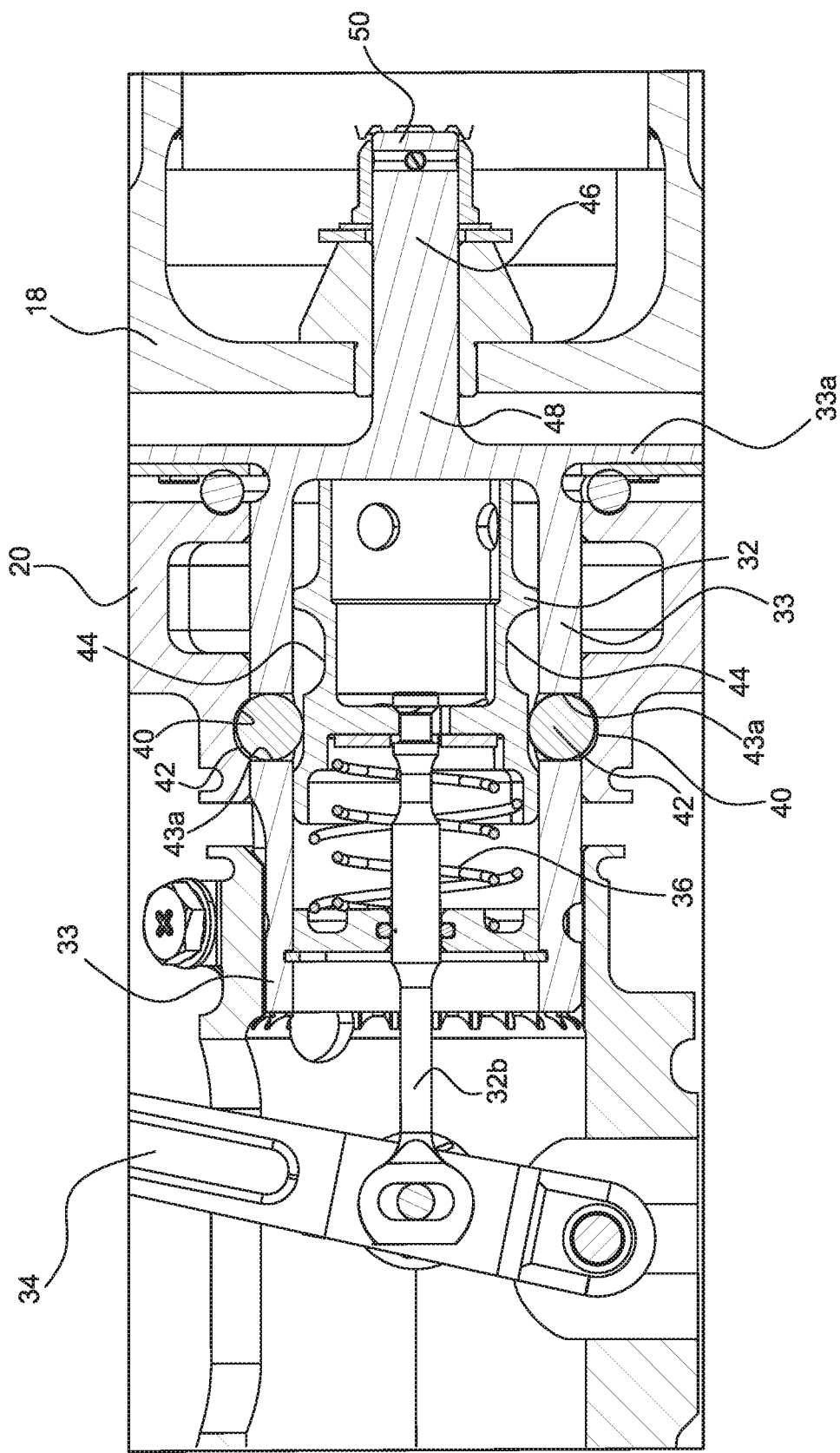
FIG. 5 is an enlarged view of the coupling mechanism shown in FIG. 4 in the engaged position thereof.
Figure 6:
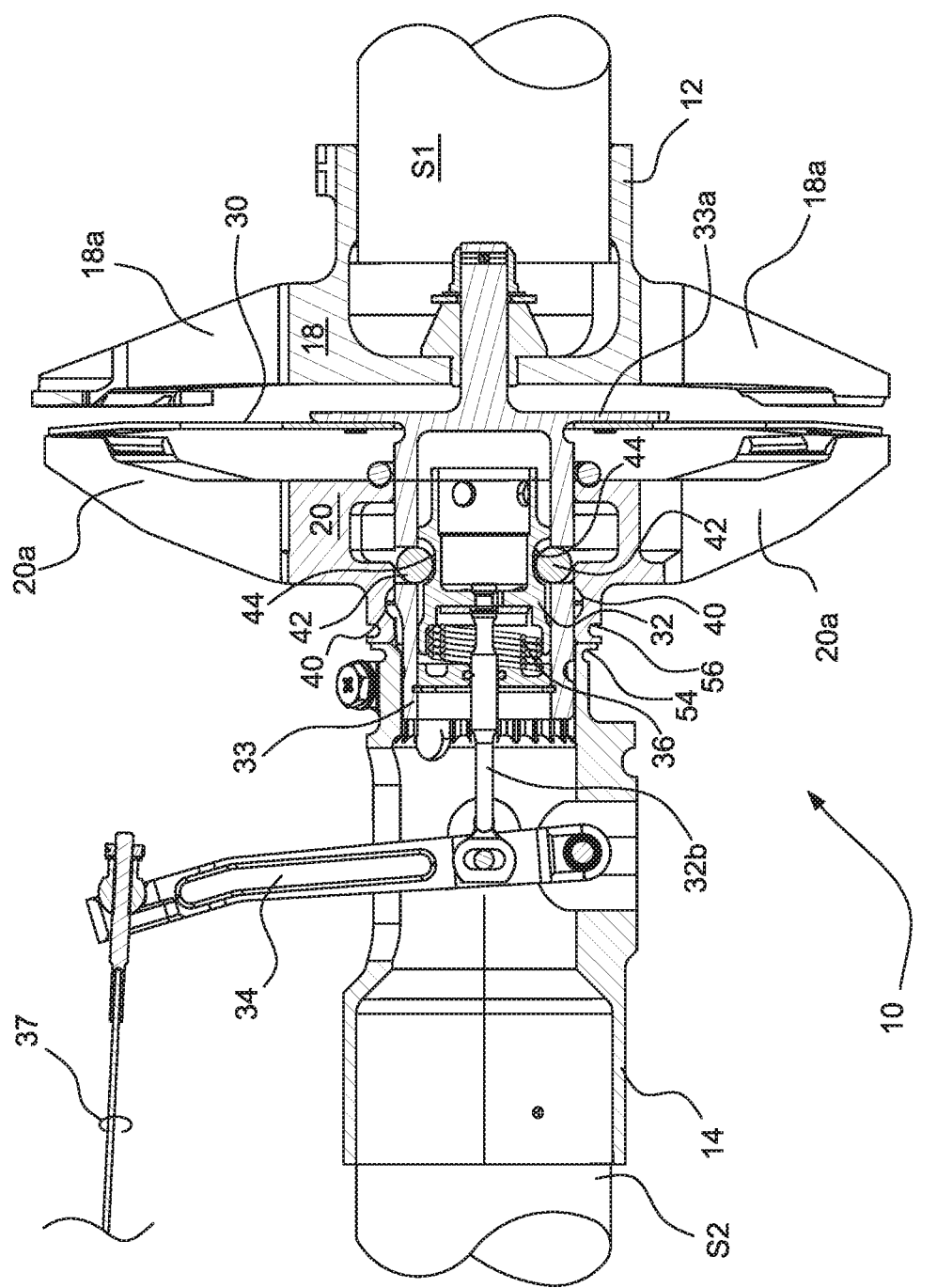
FIG. 6 is a cross-sectional elevational view of the coupling mechanism similar to FIG. 4 but shown in a disengaged position thereof.
Figure 7:
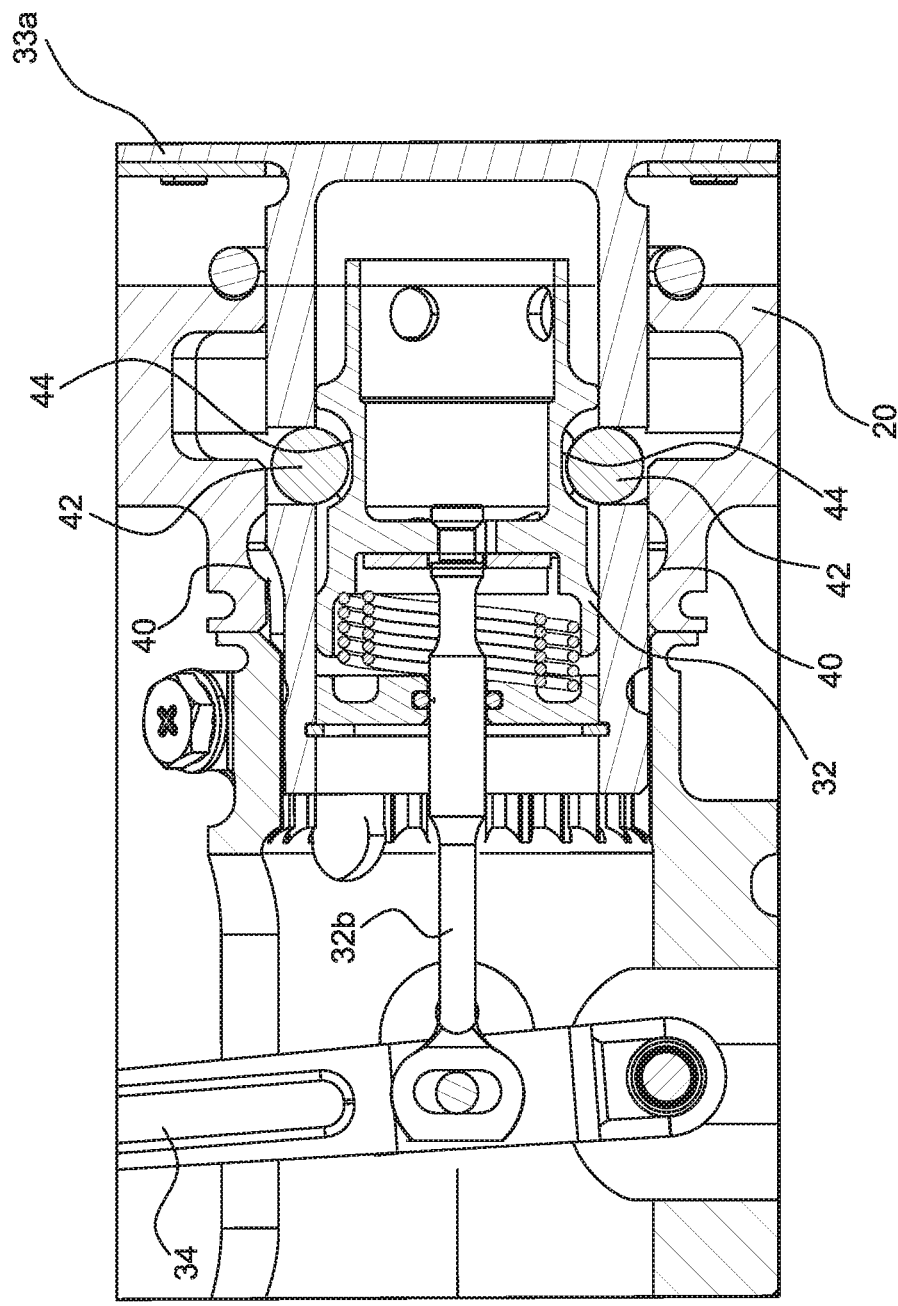
FIG. 7 is an enlarged views of the coupling mechanism shown in FIG. 6 in a disengaged positions thereof.

The inner piston 32 carries an actuator rod 32b which is operably interconnected to a lower end of the bell crank 34. A compression spring 36 is housed within the inner piston 32 and is compressed when the piston moves from the engaged position as shown in FIGS. 4 and 5 to the disengaged position as shown in FIGS. 6 and 7 in response to movement of the bell crank 34 initiated by an actuator cable 37.

The sliding plate 20 includes an internal circumferential groove 40 which receives therein ball detents 42 carried within holes 43a formed in the leaf spring hub 33 when the coupling mechanism 10 is in the engaged position thereof. The inner piston 32 on the other hand defines a piston groove 44 that is positioned forwardly of the ball detents 42 when the coupling mechanism 10 is in the engaged position. The compression spring 36 thus maintains the ball detents 42 locked within the sliding plate groove 40 when the coupling mechanism 10 is in the engaged position.

To disconnect the plates 18, 20, the coupling mechanism 10 is operated so as to pivotally move the bell crank 34 into a disengaged position, e.g., by operably exerting a pulling force (see arrow A1 in FIG. 3) through the cable 37. This actuation of the bell crank 34 causes the inner piston 32 to be moved in a leftward direction as viewed in FIGS. 5 and 7 thereby compressing the compression spring 36 and thereby load the spring 36 with a spring bias force. Movement of the inner piston 32 will thereby align the piston groove 44 with the ball detents 42 thereby releasing the ball detents 42 from their captured relationship within the sliding plate groove 40. Upon release of the ball detents 42 from the plate groove 40, the preloaded force from the leaf spring 30 will forcibly move the sliding plate 20 axially relative to the hub 33 in a leftward direction as viewed in FIGS. 5 and 7 thereby disengaging the sliding plate 20 from the fixed plate 18. Following disconnection, one of the shafts S1 or S2 can continue to rotate by virtue of the rotational bearing 46 of fixed plate 18 being interconnected to the forwardly projecting shaft 48 associated with the flange 33a of the sliding plate hub 33.

The torque transmitted during the moment of actuation does not affect the force needed to move the bellcrank 34 during disengagement. In this regard, the preloaded force existing between sliding plate 20, the fixed plate 18 and the leaf spring defines such preloaded force. An adjusting nut 50 may thus be provided at the terminal end of the projecting shaft 48 so as to allow selective adjustment of the force preload and, therefore, in turn the disconnecting force. Thus, if the nut 50 is tightened, the preload and disconnecting forces increase, while conversely if the nut 50 is loosened, such preload and disconnecting force decrease. The force preload also affects the maximum transmitted torque allowed by the coupling mechanism 10. Thus, the greater the preload force, the higher the maximum transmitted torque and vice versa. Those skilled in this art will readily recognize the parameters for the preloaded force of the coupling mechanism 10 based on the application in which the coupling mechanism 10 is employed.

Figure 8:
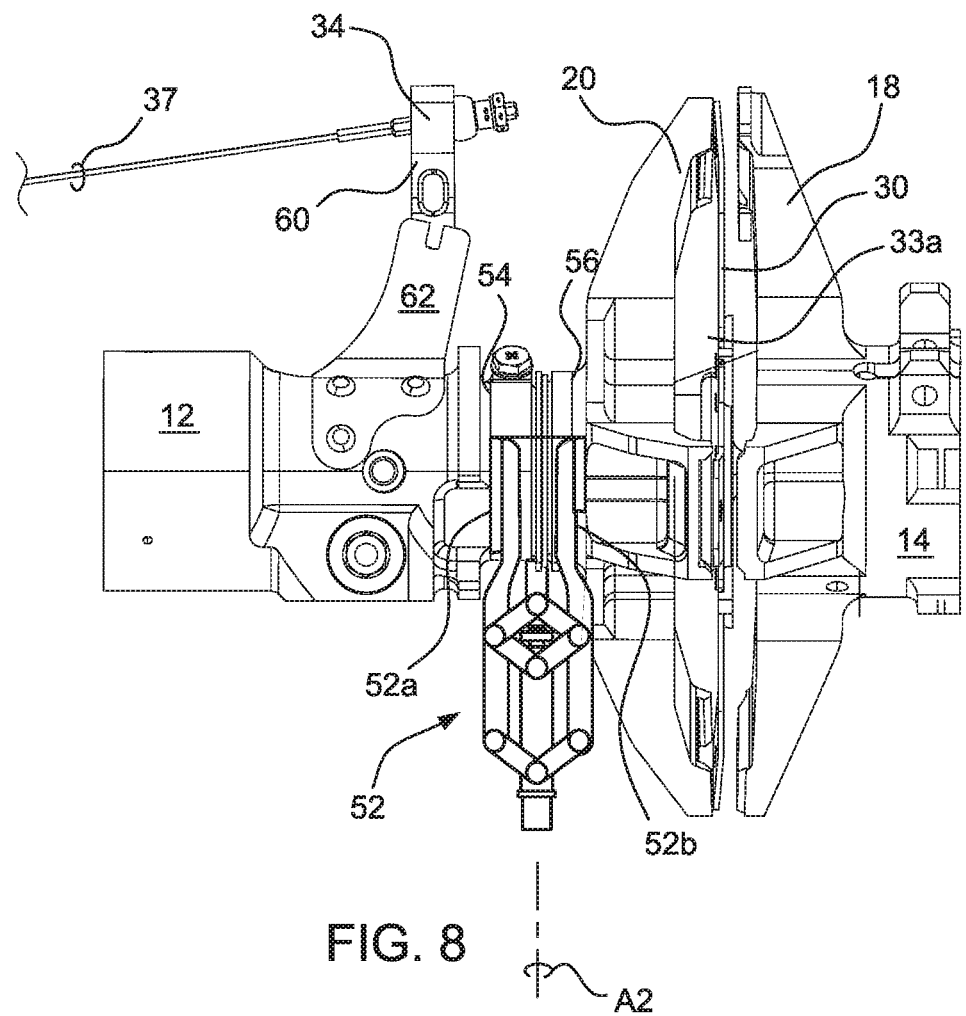
FIG. 8 is a side elevational view of the coupling mechanism as shown in a disengaged position in combination with a jack assembly to establish an engaged position of the coupling mechanism.
Figure 9:
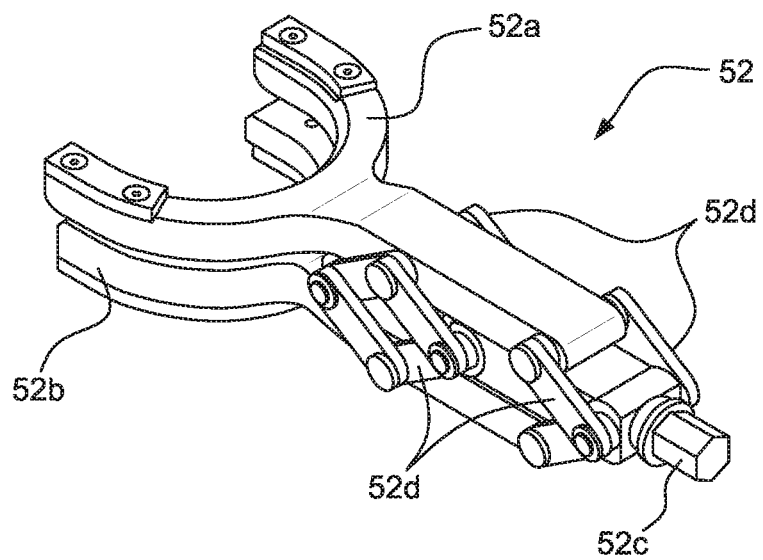
FIG. 9 is a perspective view of the jack assembly shown in operational use in FIG. 8.

In order to reengage the coupling mechanism 10 and thereby reconnect the plates 18 and 20, it is necessary to employ a mechanical scissors jack 52 as shown in FIGS. 8 and 9. As shown, the respective jaws 52a, 52b are connected to one another by means of linkages 52d. Turning movement (arrow A2 in FIG. 8) applied to a jack screw 52c will thus move the jaws 52a, 52b closer together or farther apart in dependence upon the direction of such turning movement. The jaw 52a is received within an external circumferential groove 54 associated with the connection sleeve 12 while the jaw 52b is received within an external circumferential groove 56 associated with the hub 33 of the sliding plate 20.

When positioned in such grooves as shown in FIG. 8, therefore, turning movement of the jack screw 52c in a direction causing the jaws 52a, 52b to spread and move farther apart from one another. Spreading of the jaws 52a, 52b will in turn move the sliding plate 20 axially relative to the hub 33 and thereby press the sliding plate 20 against the leaf spring 30 and cause the sliding plate 20 and fixed plate 18 to once again be engaged. This movement will continue until the sliding plate groove 40 is aligned with ball detents 42 thereby allowing the ball detents to once again be seated within the plate groove 40. Simultaneously with the seating of the ball detents within the plate groove 40, the inner piston 32 will be pushed in the rightward direction as shown in FIGS. 5 and 7 under the bias force unloading from the compression spring 36 thereby retaining the ball detents 42 within the sliding plate groove 40 and thereby locking the sliding plate 20 in place against the preloaded force of the leaf spring 30. Movement of the inner piston 32 will simultaneously move the shaft 32b so as to pull the disconnection bell crank 34 from its disengaged position and back into its engaged and locked position. Such a locked position is visually indicated by the alignment between a mark 60 on the disconnection bellcrank 34 and a slot 62 formed on a fixed position indicator plate 62 attached to the connection sleeve 12 (see FIGS. 1 and 3), at which time the operator can stop turning the jack screw 52c.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A coupling mechanism for torque transmitting shafts comprising:
   sliding and fixed plates operably connectable to respective torque transmitting shafts;
   a leaf spring having a preloaded spring force exerted on the sliding plate when the sliding and fixed plates are operably connected to one another;
   a hub attached to the leaf spring and coaxially received within the sliding plate to allow the sliding plate to be capable of reciprocal axial movements relative to the hub between engaged and disengaged positions wherein the sliding and fixed plates are engaged and disengaged with one another so as to allow and prevent torque being transmitted from one to another of the shafts, respectively; and
   an inner piston coaxially received within the hub and moveable between a first position wherein the hub retains the sliding plate in the engaged position thereof, and a second position wherein the hub releases the sliding plate to allow movement of the sliding plate under bias force from the leaf spring into the disengaged position thereof.

2. The coupling mechanism according to claim 1, wherein the sliding plate includes a circumferential internal sliding plate groove, and wherein
   the hub includes at least one ball detent which is received within the internal groove of the sliding plate when the hub is in the first position thereof so as to retain the sliding plate in the engaged position thereof.

3. The coupling mechanism according to claim 2, wherein the inner piston comprises a piston groove which is aligned with the at least one ball detent when the hub is in the second position thereof so as to allow the at least one ball detent to be released from the sliding plate groove.

4. The coupling mechanism according to claim 3, wherein the hub includes multiple ball detents.

5. The coupling mechanism according to claim 2, further comprising a disconnection bell crank operable connected to the inner piston to move the inner piston from the first position to the second position thereof in response to the bell crank being moved into a disconnection position thereof.

6. The coupling mechanism according to claim 5, further comprising a visual indicator associated with the disconnection bell crank to visually indicate the sliding plate being in the engaged position thereof.

7. The coupling mechanism according to claim 6, wherein the visual indicator comprises a visual marking on the disconnection bell crank, and a fixed position indicator plate having a slot, wherein alignment of the visual marking and the slot of the indicator plate provides visual indication that the sliding plate is in the engaged position thereof.

8. The coupling mechanism according to claim 1, wherein the fixed plate comprises a rotational bearing, and wherein the hub comprises a forwardly projecting shaft coupled to the rotational bearing to allow one of the torque transmitting shafts to rotate when sliding and fixed plates are disconnected.

9. The coupling mechanism according to claim 8, wherein the leaf spring comprises a flange fixed to an end of the hub.

10. The coupling mechanism according to claim 9, wherein the forwardly projecting shaft includes an adjusting nut threadably connected to a terminal end thereof to allow positional adjustment of the flange so as to responsively adjust the preloaded spring force of the leaf spring.

11. The coupling mechanism according to claim 1, wherein each of the sliding and fixed plates includes multiple torque transmission arms having terminal ends that are releasably connected to one another when the sliding plate is in the engaged position thereof.

12. The coupling mechanism according to claim 11, wherein the terminal ends of the sliding and fixed plates have respective conformably shaped recesses and bosses.

13. The coupling mechanism according to claim 1, further comprising connection sleeves to connect the coupling mechanism to respective ones of the torque transmitting shafts.

14. The coupling mechanism according to claim 13, further comprising a scissors jack assembly operably connectable to a respective one of the connection sleeves and the sliding plate to move the sliding plate from the disengaged position thereof to the engaged position thereof.

15. The coupling mechanism according to claim 14, wherein
each of the respective one of the connection sleeves and the sliding plate includes an externally circumferential groove, and wherein
the scissors jack includes a pair of opposed jaws each being positionable in a respective circumferential groove associated with the respective one of the connection sleeves and the sliding plate such that operating the scissors jack so as to spread apart the opposed jaws thereof causes the sliding plate to be moved from the disengaged position and into the engaged position thereof.

16. The coupling mechanism according to claim 15, wherein
the sliding plate includes a circumferential internal sliding plate groove, and wherein
the hub includes at least one ball detent which is received within the internal groove of the sliding plate when the hub is in the first position thereof so as to retain the sliding plate in the engaged position thereof.

17. The coupling mechanism according to claim 16, wherein the inner piston comprises a piston groove which is aligned with the at least one ball detent when the hub is in the second position thereof so as to allow the at least one ball detent to be released from the sliding plate groove.

18. The coupling mechanism according to claim 17, wherein the hub includes multiple ball detents.

19. The coupling mechanism according to claim 16, further comprising a disconnection bell crank operable connected to the inner piston to move the inner piston from the first position to the second position thereof in response to the bell crank being moved into a disconnection position thereof.

20. The coupling mechanism according to claim 15, wherein the fixed plate comprises a rotational bearing, and wherein the hub comprises a forwardly projecting shaft coupled to the rotational bearing to allow one of the torque transmitting shafts to rotate when sliding and fixed plates are disconnected.

* * * * *